United States Patent
Pulz et al.

(10) Patent No.: US 8,024,179 B2
(45) Date of Patent: Sep. 20, 2011

(54) SYSTEM AND METHOD FOR IMPROVING INTERACTION WITH A USER THROUGH A DYNAMICALLY ALTERABLE SPOKEN DIALOG SYSTEM

(75) Inventors: Gregory Pulz, Cranbury, NJ (US);
Harry E. Blanchard, Rumson, NJ (US);
Steven H. Lewis, Middleton, NJ (US);
Lan Zhang, Wayne, PA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 994 days.

(21) Appl. No.: 11/929,306

(22) Filed: Oct. 30, 2007

(65) Prior Publication Data
US 2009/0112590 A1 Apr. 30, 2009

(51) Int. Cl.
*G10L 15/00* (2006.01)
(52) U.S. Cl. .................. 704/10; 704/246; 704/275
(58) Field of Classification Search ............ 704/10, 704/246, 275; 369/25.01
See application file for complete search history.

(56) References Cited

U.S. PATENT DOCUMENTS

| | | | |
|---|---|---|---|
| 6,125,341 A * | 9/2000 | Raud et al. | 704/8 |
| 7,242,752 B2 | 7/2007 | Chiu | |
| 2004/0107097 A1* | 6/2004 | Lenane et al. | 704/231 |
| 2007/0038455 A1* | 2/2007 | Murzina et al. | 704/263 |

FOREIGN PATENT DOCUMENTS
WO    WO 9743756 A1 * 11/1997
* cited by examiner

*Primary Examiner* — Daniel D Abebe (57) ABSTRACT

Disclosed are systems and methods for dynamically interacting with a user through a spoken dialogue system. A method includes the steps of (1) receiving a user utterance, (2) analyzing the user utterance for a threshold determination of dialect, (3) generating a response that reflects an incremental implementation of the dialect, (4) further varying the perceived implementation of the dialect in subsequent responses by a process of: (a) receiving a subsequent user utterance, (b) determining a modified level of confidence in the dialect based at least in part from the subsequent utterance, (c) generating a subsequent response that implements an incremental variation according to the modified level of confidence.

20 Claims, 4 Drawing Sheets

SYSTEM AND METHOD FOR IMPROVING INTERACTION WITH A USER THROUGH A DYNAMICALLY ALTERABLE SPOKEN DIALOG SYSTEM

BACKGROUND OF THE INVENTION

1. Field of the Invention

The present invention relates generally to speech recognition and more specifically to performing speech recognition based on the dialect of the speaker.

2. Introduction

Currently, sensitivity to variable accents, dialects, and further speaker characteristics is a challenge to interactive speech recognition systems. Such variables are commonly not taken into account by the current interactive speech recognition systems. Speech recognition systems can be aided by the ability to recognize and mimic the speech of its users. Currently the state of the art methods of dialect recognition do not dynamically take into account the variation in dialect depending on the background of the speaker. This can lead to embarrassing situations where an interactive speech recognition system will improperly recognize a dialect, subsequently use the improper dialect, and cause a misunderstanding with the speaker due to a continuing usage of improper dialect. Avoiding this situation and conversely creating an environment where the speaker is more comfortable is what is currently needed.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems and methods for dynamically interacting with a user through a spoken dialogue system. An exemplary method includes the steps of (1) receiving a user utterance, (2) analyzing the user utterance for a threshold determination of dialect, (3) generating a response that reflects an incremental implementation of the dialect, (4) further varying the perceived implementation of the dialect in subsequent responses by a process of: (a) receiving a subsequent user utterance, (b) determining a modified level of confidence in the dialect based at least in part from the subsequent utterance, and (c) generating a subsequent response that implements an incremental variation according to the modified level of confidence.

The principles of this invention may be utilized to better utilize voice recognition software and generating an automated response to the user that mimics the user's dialect. The principles of the invention may also be used to dynamically change the generated response as the user continues to adapt the dialect that the user speaks.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

As a preliminary matter, the term as used in this specification is defined as follows:

Dialect: variety of a language that is distinguished from other varieties of the same language by features of phonology, grammar, and vocabulary, and by its use by a group of speakers who are set off from others geographically or socially.

Figure 1:
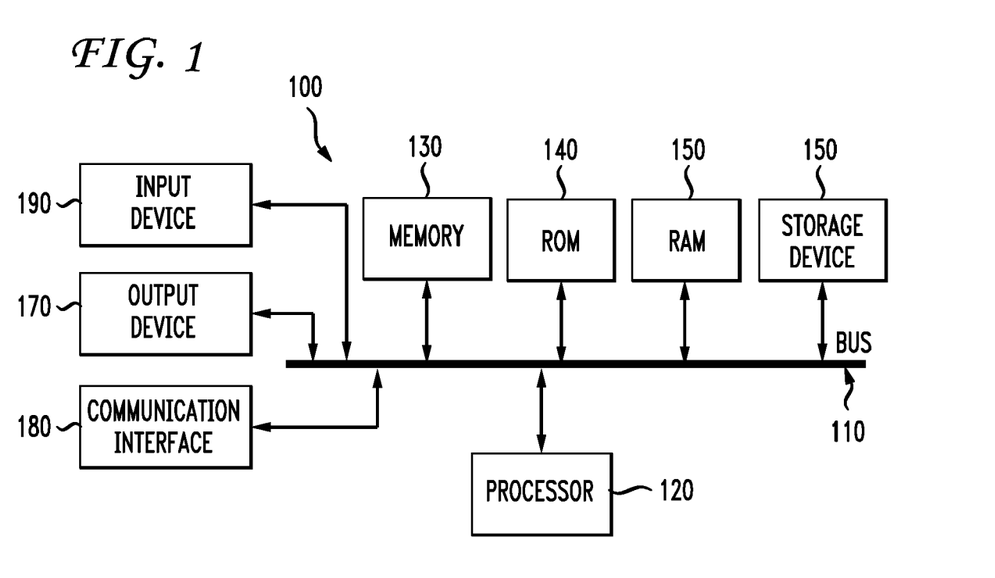
FIG. 1 illustrates a basic system or computing device embodiment of the invention.

With reference to FIG. 1, an exemplary system for implementing the invention includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS), containing the basic routine that helps to transfer information between elements within the computing device 100, such as during start-up, is typically stored in ROM 140. The computing device 100 further includes storage means such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch sensitive screen for gesture or graphical input, keyboard, mouse, motion input, speech and so forth. The input may be used by the presenter to indicate the beginning of a speech search query. The device output 170 can also be one or more of a number of output means. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative embodiment of the present invention is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Figure 2:
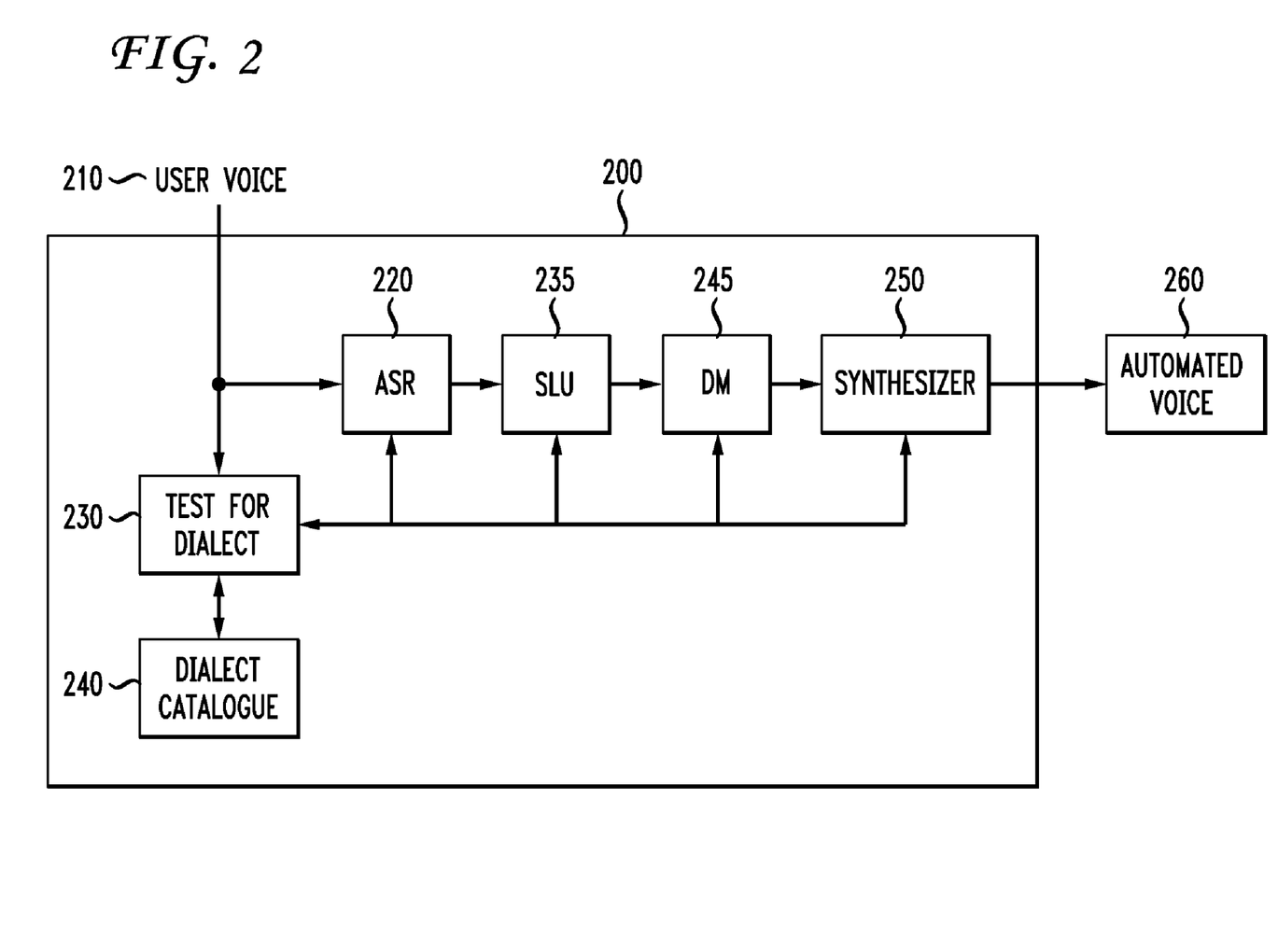
FIG. 2 illustrates an example system for dynamically analyzing a user voice and generating an automated response.

Referring to FIG. 2, the spoken dialog system 200 of the present application will receive as input a user's voice or utterance 210 that is then processed by the system 200. Spoken dialog systems 200 are typically based on a sterile environment in order to operate at the highest accuracy rate. One component of this sterile environment has been the use of a standardized General American English dialect. However, one aspect of the system allows the speech recognition software to recognize terms outside of this sterile environment and be accessible to those with dialects outside of the standardized dialect. Therefore, an example system has the ability to incrementally correct for the dialect of a user in order to facilitate the user's interaction with the system.

In one exemplary embodiment, the input or utterance from the user is converted to text using an automatic speech recognition (ASR) module 220. The text from the ASR module 220 and/or audio information from the user utterance is then transferred to a testing module 230 where the text and/or audio is tested against known dialect parameters that are stored in the dialect catalogue 240. This dialect catalogue 240 is accessible to the testing module 230 that serves to identify parameters of speech within different dialects of language. This dialect catalogue 240 is populated with a variety of terms and data from one or more identifiable dialects that the system 200 may encounter.

This embodiment can be beneficial to national or regional companies that have automated systems. If a product is only sold in Brooklyn, N.Y., then it would be advantageous to have a system 200 that could both recognize and process a distinctive dialect from this region. Whereas a system 200 that is accessed nationally may need to recognize not only a dialect of the boroughs of New York City but also Southern, Midwestern, and Western dialects, just to name a few. System 200 can then reference the dialect catalogue 240 after each time the user speaks by first converting the voice to text using the ASR module 220 and then testing 230 the text and/or speech and to further assess the proper dialect and to further eliminate any error in word detection. The testing module 230 may also directly receive the user utterance 210 to test for a particular dialect.

A further aspect of the system 200 relates to generating an automated response 260 that mimics the dialect of the user by analyzing the digital signal from the ASR module 220 in a spoken language understanding module (SLU) 235 or a dialogue management (DM) module 245. As shown in FIG. 2, SLU module 235 and DM module 245 can both be in communication with each other, the ASR 220, and the testing module 230. The system benefits with this arrangement by using the information gathered by the respective units being communicated with the testing module. For instance, the SLU can contextualize the utterance so the system 200 can differentiate vocabulary. The dialogue management module 245 generates text that is used by the synthesizer 250 and allows for a more natural interaction with the user. The automated response 260 is generated by synthesizer 250 using the text from the DM module 245 and data associated with a dialect to be perceived in the spoken response. Module 250 may be a Text-to-Speech (TTS) Module or any known module for generating an available response.

Typically the user utterance will be received by the ASR module 220 and the digital signal from the ASR module 220 will be transferred to the SLU module 235 to gain a further understanding of what the user utterance was attempting to communicate. The resulting signal from the SLU module 235 may be sent to the testing module 230 in order to determine the dialect of the user. The appropriate dialect, chosen from the dialect catalogue 240, will be communicated from the testing module 230 to the DM module 245. The DM module 245 will produce the appropriate response using the selected dialect which is transferred to the synthesizer 250. The synthesizer 250 will then generate the automated voice 260 reflecting the appropriate dialect and the appropriate amount of dialect as determined by the testing module 230. Data associated with an identified or selected dialect may be communicated to or from any of the modules in FIG. 2 as needed.

In preparation of the system 200 communicating with the user, the dialect catalogue 240 is preferably populated with the appropriate terms and inflections that are indicative of speakers utilizing a dialect. Within these terms and inflections will be categories of speech that will allow the system to narrow down the origin of the dialect and allow the program to better interact with the user. This interaction is more efficient because the perspective of the computer program will change. An example use of this will be if in a certain dialect certain difficult phraseology or words are preferred, that data may cause the DM module 245 to select different text in formulating a response than it otherwise would select.

Access to these stored characteristics can be controlled by the program based on analysis of the user's speech. In one example, the system 200 contains software testing the user's speech with the testing module 230 and checking for known parameters within the dialects known in the dialect catalogue 240. Each dialect contains initial parameters that the system recognizes as preliminary characteristics of a particular dialect. Upon meeting these preliminary characteristics, a threshold determination is made that the person is speaking with a particular dialect. Further, the automated response 260 would contain some or a proportional portion of the characteristics of that particular dialect. With each subsequent user answer the system 200 confirms the appropriate dialect for the specific user.

Figure 3:
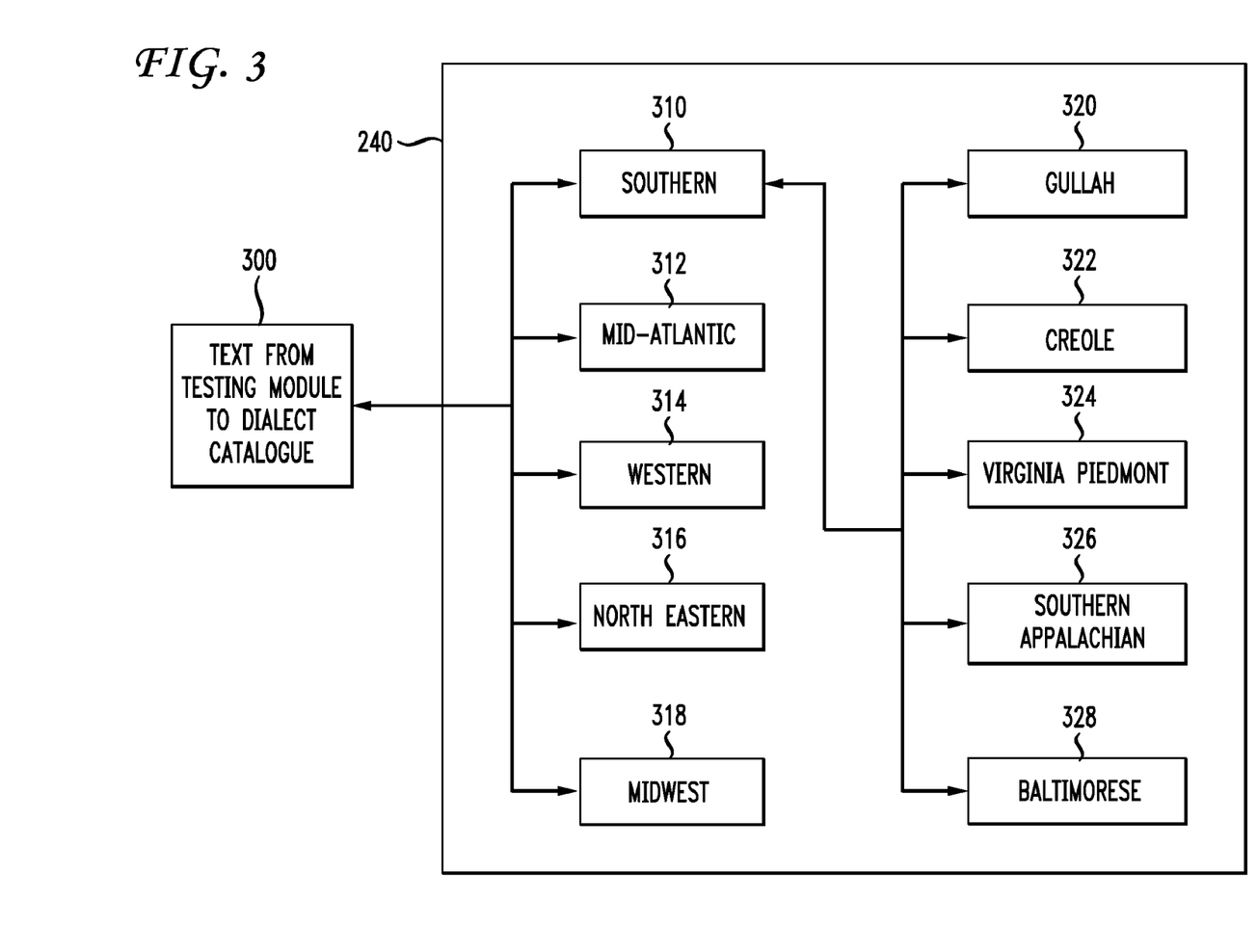
FIG. 3 illustrates a method of narrowing down the chosen dialect of the user.

FIG. 3 illustrates how the system 200 begins to narrow down the origin of the dialect, and shifts its perspective from a sterile environment to the dialect of the user. Initially the dialect catalogue 240 is accessed by the testing module 230. The testing module 230 compares phonemes based on the text from the voice to text module 220, the original user utterance, or both to the different dialects in the dialect catalogue 240. An example of this is a caller using non-rhotic speech that the system 200 recognizes as representative of either north-eastern dialect 316 or a southern dialect 310 as both will exhibit these properties. The testing module 230 also analyzes the speech for dialect distinctive vocabulary, which in this example may be the user saying "y'all." Thus, based on accent and vocabulary, the testing module 230 makes an initial determination that the user response has a southern dialect 310. Then a subsequent user response is used to further confirm the chosen dialect and refine it to a specific sub-dialect within the southern dialect 310. Since the dialect is non-rhotic and the user exhibits a drawl within words, the testing module 230 further narrows the dialect to Virginia Piedmont 324. This chosen dialect replaces the aforementioned sterile environment changing the assumptions the system 200 uses to analyze and generate user interactions. Using the chosen dialect allows the system 200 to accept the nuances of the chosen dialect as standard, thus allowing better user interaction. This also allows the system 200 to modify the speech models used by the ASR module 220. By allowing this modification of the sterile environment, the system 200 will be able to adapt to differences in speech and be able to better serve the user.

One way that the system 200 can analyze different dialects is by recognizing the different phonemes that are used in different dialects of languages. Using English as an example, there is an International Phonetic Alphabet (IPA) for English produced by the International Phonetic Association that lists an alphabet of phonemes that are spoken in the English language and different dialects can be recognized by the phonemes of their respective speech. Further the IPA can be used for many languages besides English and reflects the sounds made in all speech and can be used to recognize words and dialects. It should be further noted that the system 200 can function within any known spoken language and is not limited to use with the English language.

Another parameter of speech that the system 200 can analyze and mimic is the delivery speed of a user utterance. Some speech patterns are slow and deliberate while others are fast and loose. This can in some respects be related to and contained within the prosody of the speech which can describe tone, intonation, rhythm, focus, syllable length, loudness, pitch, formant, or lexical stress. The system can analyze and mimic all of these factors. For example, if the user speaks quickly, the system 200 may incrementally speed up its generated utterances to match the speech (and thus dialect) of the user.

The system can also utilize further parameters of speech to discern the dialect of the user. One example is vocabulary, which can be geographically specific. For instance, in the United States, there are parts of the country that use "pop" versus "soda", "tennis shoes" versus "sneakers", and "lollipop" versus "sucker" to describe the same object. There are also specific terms that are accepted in some regions and shunned in others. "Y'all" has gained wide acceptance in the Southern dialect as a contraction of the phrase "you all" but is not recognized in other dialects. There are also syntax and grammar differences in the speech patterns of some dialects, represented by sentences with double negatives or phrases such as "I done told you" instead of "I have told you". While these examples are illustrative, the system 200 can recognize many more regionally specific vocabulary, syntax, and grammar differences in order to increase the confidence in both selecting and mimicking the proper dialect of the user. When analyzing for these parameters testing module 230 may utilize the text from ASR 220 and/or the direct user utterances. Similar terms may then be generated by the DM module 245 in the spoken dialog.

The system 200 can also recognize an accent as another parameter of speech within a dialect. An example of an accent within the English language that can be recognized is rhotic versus non-rhotic. This accent is associated with the pronunciation of the letter "r" in words. Rhotic speakers will typically pronounce the letter r wherever it is written in a word, whereas non-rhotic speakers will typically only pronounce it when it is followed by a vowel. An example of this is heard in the American Boston accent where the speaker will drop the "r" in "car" so that the spoken word sounds like "caw".

Many different dialects are recognized within the United States alone. The system 200 can recognize regional differences within the United States for example Mid-Atlantic, North-Eastern, Midwest, Southern, and Western. Within each of the aforementioned regions there are subsets of dialects that are native to that geographical location. There are also cultural dialects within the United States that involve influences from African, Irish, Scottish, Latino, and Yiddish speakers among many others. There are also socially influenced dialects that are recognizable due to the social class of the speaker. Further, there are other English speaking countries. Some non-limiting examples include: England, Scotland, Ireland, Australia, Canada, South Africa, and New Zealand.

Another group that would speak with a dialect would be non-native English speakers. These are people born outside of English speaking countries, or learning English as a second language. A person's native language can vary the pronunciation of letters within the English language. Further, there can be words that have different definitions depending on where the word is learned and the native culture of the person learning the word. Therefore, an interactive system may be frustrated without a catalogue of terms.

Within each of these dialects, there are many nuanced differences that native speakers would feel uncomfortable using while talking to the system 200. Using the United States as an example, a person could try to use a generalized American Dialect that is rhotic and free of many phonetic differences between dialects. However, upon the system 200 recognizing the differences in dialect, the user would feel much more comfortable resorting to his or her natural dialect. In case where the user does not desire to have that dialect mimicked, a dialog or some interaction may enable the user to request a particular dialect or no dialect.

The system 200 allows users to gain a comfort level by generating the automated response 260 using at least part of the dialect of the user. The system 200 recognizes certain characteristics of the dialect and can create and store them within the dialect catalogue 240 for use during the generation of the response 260.

The system 200, after recognizing the dialect of the user, can slowly evolve the response 260 after each user utterance in order to make the user more comfortable as the conversation continues. The user, perceiving the change, naturally falls back into normal speech patterns that had been sanitized for use with the system 200. Further, the system 200 is helpful to those users who have lived in two geographic regions, each with its own dialect. The system 200 will mimic whichever dialect the user is more comfortable using, and slowly allow the user to speak in the more natural dialect. This allows users to once again fall back into the normal speech patterns associated with a native dialect.

In both of the aforementioned cases, as select phrases are spoken by the user and the system 200 picks up those phrases, the system 200 will then insert verbiage that reflects the user's dialect. With each subsequent interaction with the system 200, the system 200 would become more confident in the user's dialect and the user would feel more comfortable using the dialect with the system 200. As indications within the user utterances increasingly reflect a particular dialect, the system 200 also increases the dialect in responses. This cycle of interactions between the system 200 and the user continues until the automated response 260 and the user voice 210 are consistent in dialect.

While inherent in the explanation of the system 200, it is specifically noted that it is possible for the system 200 to use too much of a dialect in the automated response 260. The system continues to analyze subsequent user utterances 210, and then removes some of the dialect in the next automated response 260. In this manner the system 200 can add too much dialect into an automated response 260 and still remove some of the parameters associated with the chosen dialect in the next automated response 260 and keep the user comfortable.

Figure 4:
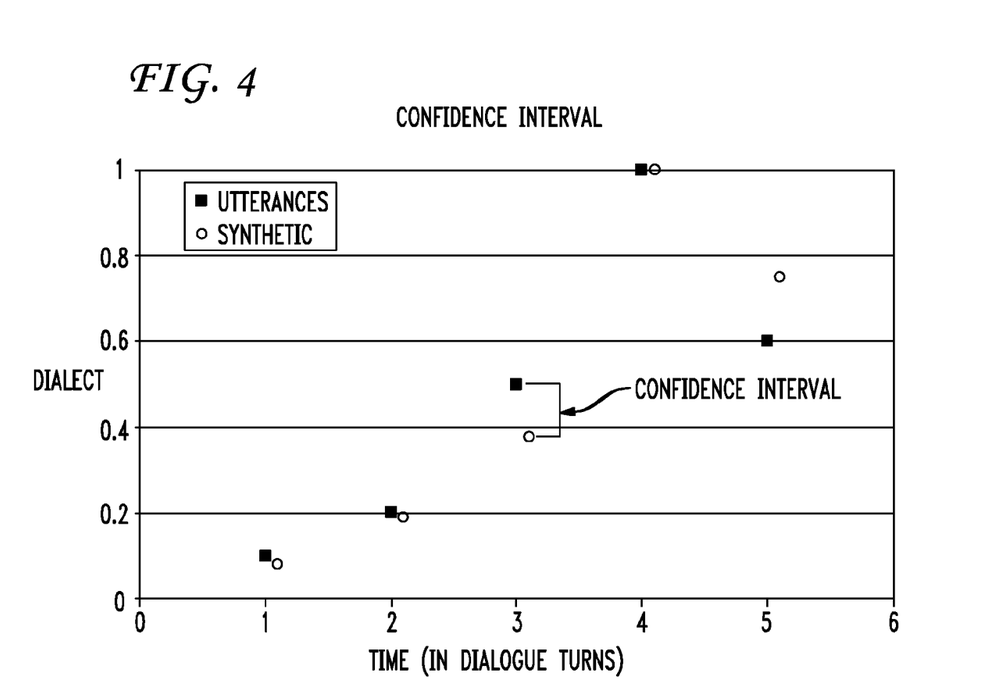
FIG. 4 illustrates the functioning of the system as it approximates the dialect of the user.

The iterative approach available to the system is further exemplified in FIG. 4. FIG. 4 represents the system being able to choose the amount of dialect contained in a response in addition to the choosing of the actual dialect. The graph represents one way the system 200 determines the amount of dialect to use in any generated response. Initially the term dialogue turn is defined as a user utterance followed by a system 200 response. In FIG. 4 this is represented by a square followed subsequently by a circle at time frame 1 representing the utterance and the generated system 200 response respectively. With the initial dialogue turn the user initially speaks an utterance with only a small amount of dialect. The system 200 then responds with a small amount of dialect. With the next dialogue turn the user increases the amount of dialect used in the utterance and this causes the system 200 to responds with an increased level of confidence in the level of dialect, reflected by small separation of the amount of dialect contained in the utterance and response in the second dialogue turn at time 2.

In the third dialogue turn at time 3, the user significantly increases the amount of dialect in the utterance received by the system 200. In response the system 200 generates a response with a heavier dialect, but the confidence in the amount of dialect lessened due to the sudden influx of dialect in the user utterance. This lessened confidence is reflected by the system 200 not just matching the amount of dialect in the user utterance, but rather weighting the response against matching the amount of dialect due to the lower amount of dialect in the previous two dialogue turns.

In the fourth dialogue turn at time 4, the user utterance contains 100% of the characteristics of a dialect, therefore, the system 200 responds with a full implantation of dialect in the response. This is because the confidence is fully realized when the number of characteristics in the user speech is fully in sync with the known characteristics of a dialect. With the fifth dialogue turn at time 5, the user removes some dialect from the utterance causing a greater uncertainty in the system 200 compared to dialogue turn 4. The system 200 generates a response that tracks the user utterance but due to the change in dialect, the system will no longer have 100% confidence in the amount of dialect to include in the response. However, due to the slowly increasing amount of dialect, the system 200 will remove some of the dialect and wait for the next dialogue turn to see if the amount of dialogue will level out at a certain amount. This iterative approach of the generated response tracking the utterance will continue until both utterance and generated response contain the same amount of dialect, the interaction terminates or perhaps the user selects or provides input requesting a particular dialect or no dialect. It is further presented that this method of tracking is but one possible method and many others will be practiced by those of skill in the art that will still fall within the scope of the present claims.

The tracking described can take place in any conceivable way, but some non-limiting examples of a system that would properly track user utterance is the system applying a weighted-average of the previous responses to guard against sudden jumps into too much dialect. Another option would be to mimic the exact level of dialect contained in the first half of the dialogue turn as judged by the characteristics in each utterance. The system 200 could also independently judge with each response the threshold of the dialect and then use the threshold determination to choose the closest level of dialect that it has available. An example would be a response with 55% dialect and the closest library of responses would be at 50%. Therefore, the system 200 would choose responses from the 50% catalogue. Outside data such as location data may also be used by the system in negotiating information. These examples are not meant to limit the scope of the claims.

In a combination of FIGS. 3 and 4, the system would be able to determine concurrently the origin of the dialect and the amount of the determined dialect to use in a generated response. Upon a second user response, the system would analyze the response to make sure the proper dialect was chosen as well as that the proper amount of dialect was included.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, this catalogue-based approach could be substituted with an interactive learning based program that mimics the user's dialect as it is spoken, rather than accessing stored terms. A further example of a system configuration is its use with any language, for example Spanish or French. Accordingly, the appended claims and their legal equivalents should only define the invention, rather than any specific examples given.

What is claimed is:

1. A method for dynamically interacting with a user through a spoken dialogue system, the method comprising:
   receiving a user utterance;
   analyzing the user utterance for a threshold determination of a dialect;
   generating a response that reflects an incremental implementation of the dialect;
   further varying a perceived implementation of the dialect in subsequent responses by a process of:
   (a) receiving a subsequent user utterance;
   (b) determining a modified level of confidence in the dialect based at least in part from the subsequent utterance; and
   (c) generating a subsequent response that implements an incremental variation according to the modified level of confidence.

2. The method of claim 1 wherein the response is incrementally varied by modifying a parameter selected from the group consisting of verbiage, vocabulary, pronunciation, phrasing, pauses, and prosody.

3. The method of claim 1 further comprising:
   receiving at least one successive user utterance;
   applying process steps (a)-(c) iteratively to the at least one successive user utterance.

4. The method of claim 3 further comprising generating at least one successive response, wherein the at least one successive response tracks the dialect of the at least one successive user utterance.

5. The method of claim 1 wherein the perceived implementation of the dialect becomes stronger.

6. The method of claim 1 wherein the perceived implementation of the dialect becomes weaker.

7. The method of claim 1 further comprising:
   receiving at least a third user utterance;
   determining a higher level of confidence in the dialect based at least in part from the at least third user utterance; and
   generating at least a third response that implements an incremental variation according to the higher level of confidence.

8. A spoken dialogue system comprising a plurality of program modules embodied in at least one of non-transitory, computer readable and executable media, including:
   a processor;
   a first module configured to control the processor to receive a user utterance;
   a second module configured to control the processor to analyze the user utterance for a threshold determination of a dialect;
   a third module configured to control the processor to generate a response that reflects an incremental implementation of the dialect;
   a fourth module configured to control the processor to further vary a perceived implementation of the dialect wherein the module to further vary the perceived implementation of the dialect is configured to receive a subsequent user utterance, determine a modified level of confidence in the dialect based at least in part from the subsequent utterance, and generate a subsequent response that implements an incremental variation according to the modified level of confidence.

9. The system of claim 8 wherein the third module is further configured to vary the response incrementally by modifying a parameter selected from the group consisting of verbiage, vocabulary, pronunciation, phrasing, pauses, and prosody.

10. The system of claim 8 further comprising:
    a fifth module configured to control the processor to receive at least one successive user utterance; and
    a sixth module configured to control the processor to iteratively vary the perceived implementation of the dialect wherein the module to iteratively vary the perceived implementation of the dialect is configured to receive the at least one successive user utterance, determine a successive level of confidence in the dialect based at least in part from the at least one successive user utterance, and generate a successive response that implements an incremental variation according to the successive level of confidence.

11. The system of claim 10 further comprising a seventh module configured to control the processor to generate at least one successive response, wherein the at least one successive response tracks the dialect of the at least one successive user utterance.

12. The system of claim 8 wherein the perceived implementation of the dialect becomes stronger.

13. The system of claim 8 wherein the fourth module configured to control the processor to further vary the perceived implementation of the dialect modifies the dialect to becomes weaker.

14. A non-transitory computer readable medium storing computer-executable instructions for a computing device to function as a spoken dialogue system, the instructions comprising:
    receiving a user utterance;
    analyzing the user utterance for a threshold determination of a dialect;
    generating a response that reflects an incremental implementation of the dialect;

further varying a perceived implementation of the dialect in subsequent responses by a process of:
(a) receiving a subsequent user utterance;
(b) determining a modified level of confidence in the dialect based at least in part from the subsequent utterance; and
(c) generating a subsequent response that implements an incremental variation according to the modified level of confidence.

15. The non-transitory computer readable medium of claim 14 wherein the instructions provide that the response be incrementally varied by modifying a parameter selected from the group consisting of verbiage, vocabulary, pronunciation, phrasing, pauses, and prosody.

16. The non-transitory computer readable medium of claim 14 further comprising:
receiving at least one successive user utterance;
applying process steps (a)-(c) iteratively to the at least one successive user utterance.

17. The non-transitory computer readable medium of claim 16 further comprising generating at least one successive response, wherein the at least one successive response tracks the dialect of the at least one successive user utterance.

18. The non-transitory computer readable medium of claim 14 wherein the instructions change the perceived implementation of the dialect to become stronger.

19. The non-transitory computer readable medium of claim 14 wherein the instructions change the perceived implementation of the dialect to become weaker.

20. The non-transitory computer readable medium of claim 14 further comprising:
receiving at least a third user utterance;
determining a higher level of confidence in the dialect based at least in part from the at least third user utterance; and
generating at least a third response that implements an incremental variation according to the higher level of confidence.

* * * * *